US012578201B2

(12) United States Patent　　　(10) Patent No.:　US 12,578,201 B2
Witwicki et al.　　　　　　　　　(45) Date of Patent:　　Mar. 17, 2026

(54) SITUATIONAL COMPLEXITY DETERMINATION SYSTEM

(71) Applicant: NISSAN NORTH AMERICA, INC., Franklin, TN (US)

(72) Inventors: Stefan Witwicki, San Carlos, CA (US); Erik St. Gray, Tacoma, WA (US); Takehito Teraguchi, Cupertino, CA (US); Anne Brétonnière, Paris (FR)

(73) Assignee: NISSAN NORTH AMERICA, INC., Franklin, TN (US)

( * ) Notice: Subject to any disclaimer, the term of this patent is extended or adjusted under 35 U.S.C. 154(b) by 167 days.

(21) Appl. No.: 17/877,866

(22) Filed: Jul. 29, 2022

(65) Prior Publication Data

US 2024/0035842 A1　　Feb. 1, 2024

(51) Int. Cl.
　　*G01C 21/36*　　　(2006.01)
　　*G01C 21/28*　　　(2006.01)
(52) U.S. Cl.
　　CPC ......... *G01C 21/3691* (2013.01); *G01C 21/28* (2013.01)
(58) Field of Classification Search
　　CPC ........................... G01C 21/3691; G01C 21/28
　　See application file for complete search history.

(56) References Cited

U.S. PATENT DOCUMENTS

| | | | |
|---|---|---|---|
| 10,490,078 B1 * | 11/2019 | Fields | .............. G08G 1/096838 |
| 10,654,476 B2 | 5/2020 | Wray et al. | |
| 11,084,504 B2 | 8/2021 | Wray et al. | |
| 11,113,973 B2 | 9/2021 | Wray et al. | |
| 2019/0329771 A1 | 10/2019 | Wray et al. | |
| 2019/0361442 A1 * | 11/2019 | Izaki | ...................... B60K 35/23 |
| 2020/0097003 A1 | 3/2020 | Wray et al. | |
| 2020/0098269 A1 | 3/2020 | Wray et al. | |
| 2020/0269875 A1 | 8/2020 | Wray et al. | |
| 2020/0331491 A1 | 10/2020 | Wray et al. | |
| 2021/0139024 A1 * | 5/2021 | Crego | ............... B60W 30/0953 |
| 2021/0157314 A1 | 5/2021 | Wray et al. | |
| 2021/0157315 A1 | 5/2021 | Wray et al. | |
| 2021/0180981 A1 * | 6/2021 | Matsumoto | ............ G06V 20/56 |
| 2021/0188297 A1 | 6/2021 | Wray et al. | |

(Continued)

OTHER PUBLICATIONS

Rongjie Yu et al. "Dynamic driving environment complexity quantification method and its verification", 2021. (Year: 2021).*

*Primary Examiner* — Anne Marie Antonucci
*Assistant Examiner* — Misa H Nguyen
(74) *Attorney, Agent, or Firm* — Spencer Fane, LLP

(57)　　　　　ABSTRACT

A vehicle includes an on-board satellite navigation device, a telematics control unit, a non-transitory computer readable medium, and a processor. The on-board satellite navigation device is in communication with a global positioning system unit to acquire real-time information regarding conditions near the vehicle's vicinity. The telematics control unit is in wireless communications to a cloud services or a vehicle network to upload and receive crowdsourced information regarding conditions near the vehicle's vicinity. The non-transitory computer readable medium stores predetermined information regarding conditions near the vehicle vicinity. The processor is programmed to output one or more complexity values related to the vehicle's vicinity during vehicle travel based on one or more of the real-time information, the crowdsourced information and the predetermined information.

5 Claims, 11 Drawing Sheets

(56)　　　　　　　　References Cited

U.S. PATENT DOCUMENTS

| | | | |
|---|---|---|---|
| 2021/0200208 A1 | 7/2021 | Wray et al. | |
| 2021/0237759 A1 | 8/2021 | Wray et al. | |
| 2021/0240190 A1 | 8/2021 | Wray et al. | |
| 2022/0034671 A1 * | 2/2022 | Pal ..................... | G01C 21/3691 |
| 2022/0266851 A1 * | 8/2022 | Sato ...................... | B60W 40/08 |
| 2022/0397402 A1 * | 12/2022 | Bolless .............. | G01C 21/3841 |

* cited by examiner

FIG. 4

SCENARIO C: SEQUENCE OF UPCOMING
DECISIONS IN RAPID SUCCESSION

UNPROTECTED INTERSECTION

FIG. 9

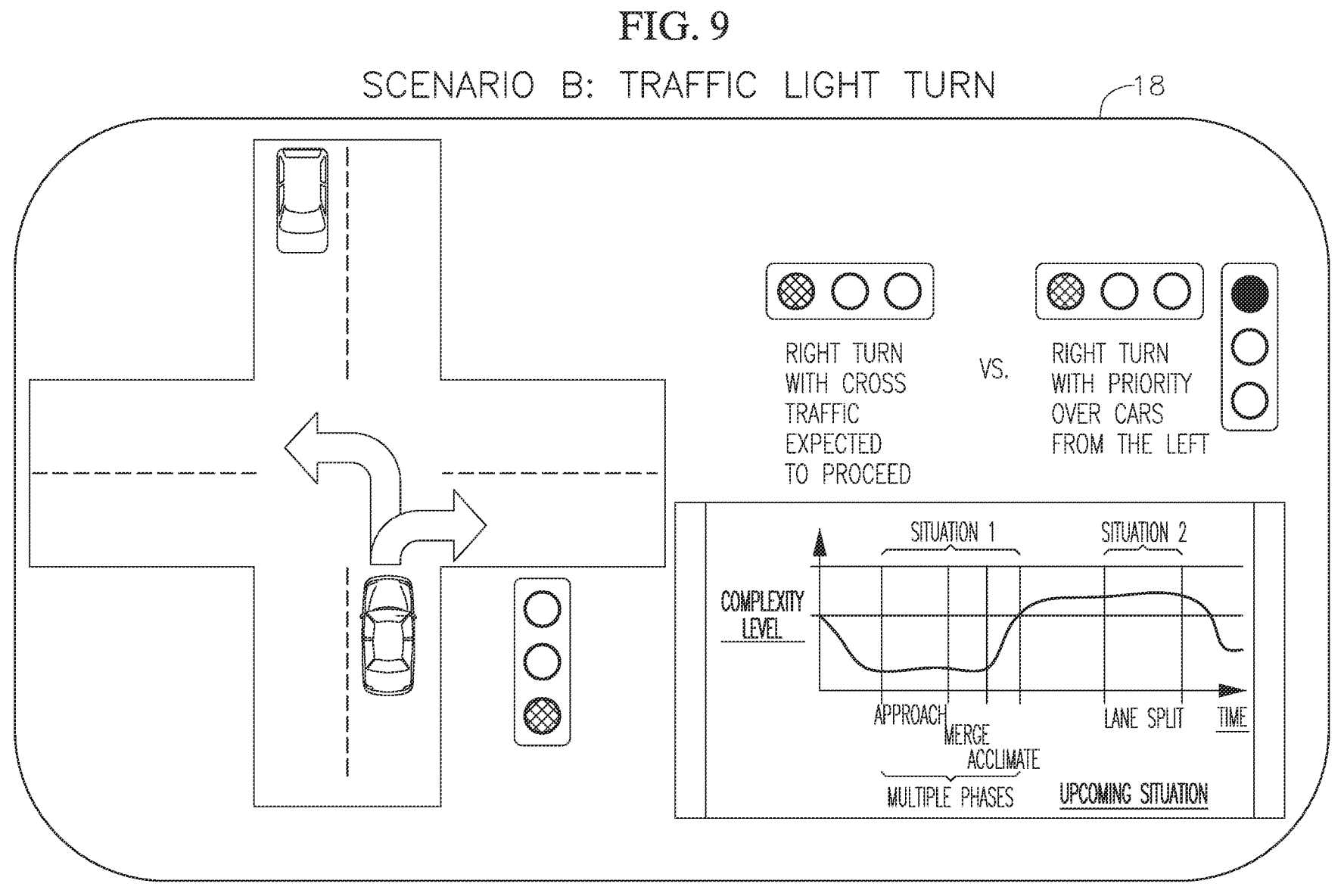

SCENARIO B: TRAFFIC LIGHT TURN

RIGHT TURN
WITH CROSS
TRAFFIC
EXPECTED
TO PROCEED

VS.

RIGHT TURN
WITH PRIORITY
OVER CARS
FROM THE LEFT

COMPLEXITY
LEVEL

TIME

SITUATION 1

SITUATION 2

APPROACH

MERGE

ACCLIMATE

MULTIPLE PHASES

LANE SPLIT

UPCOMING SITUATION

| | SCENARIO 1 (UPCOMING INTERSECTION) | SCENARIO 2 (UPCOMING SUDDEN STOP) | SCENARIO 3 (UPCOMING LANE MERGE) |
|---|---|---|---|
| COMPLEXITY THRESHOLD | X | Y | Z |

FIG. 11

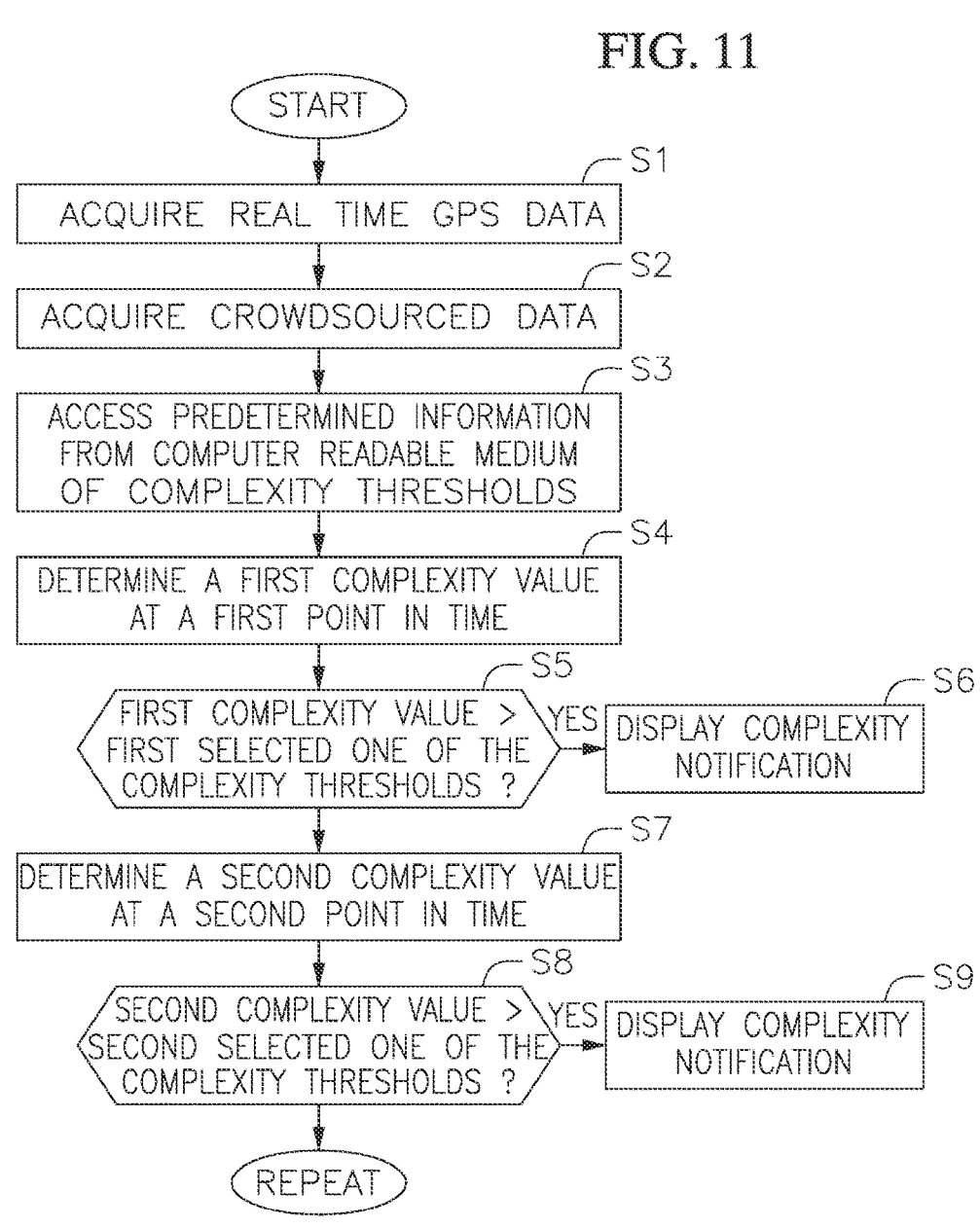

START

S1 — ACQUIRE REAL TIME GPS DATA

S2 — ACQUIRE CROWDSOURCED DATA

S3 — ACCESS PREDETERMINED INFORMATION FROM COMPUTER READABLE MEDIUM OF COMPLEXITY THRESHOLDS

S4 — DETERMINE A FIRST COMPLEXITY VALUE AT A FIRST POINT IN TIME

S5 — FIRST COMPLEXITY VALUE > FIRST SELECTED ONE OF THE COMPLEXITY THRESHOLDS ?

YES → S6 — DISPLAY COMPLEXITY NOTIFICATION

S7 — DETERMINE A SECOND COMPLEXITY VALUE AT A SECOND POINT IN TIME

S8 — SECOND COMPLEXITY VALUE > SECOND SELECTED ONE OF THE COMPLEXITY THRESHOLDS ?

YES → S9 — DISPLAY COMPLEXITY NOTIFICATION

REPEAT

SITUATIONAL COMPLEXITY DETERMINATION SYSTEM

BACKGROUND

Technical Field

The present disclosure generally relates to situational a complexity determination system. More specifically, the present disclosure relates to a situational complexity determination system to be implemented to a vehicle for use during navigation.

Background Information

A vehicle may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle.

SUMMARY

In view of the state of the known technology, one aspect of the present disclosure is to provide a vehicle comprising an on-board satellite navigation device, a telematics control unit, a non-transitory computer readable medium, and a processor. The on-board satellite navigation device is in communication with a global positioning system unit to acquire real-time information regarding conditions near the vehicle's vicinity. The telematics control unit is in wireless communications to a cloud services or a vehicle network to upload and receive crowdsourced information regarding conditions near the vehicle's vicinity. The non-transitory computer readable medium stores predetermined information regarding conditions near the vehicle vicinity. The processor is programmed to output one or more complexity values related to the vehicle's vicinity during vehicle travel based on one or more of the real-time information, the crowdsourced information and the predetermined information.

In view of the state of the known technology, another aspect of the present disclosure is to provide a method for informing a cloud services and a vehicle network regarding complexity conditions of a travel route. The method comprises acquiring real-time information regarding conditions near the vehicle's vicinity from an on-board satellite navigation device in communication with a global positioning system unit. The method further comprises acquiring crowdsourced information regarding conditions near the vehicle's vicinity from a telematics control unit in wireless communications with at least one of a cloud services and a vehicle network. The method further comprises acquiring predetermined information from a non-transitory computer readable medium. The method further comprises determining a first complexity value related to the vehicle's vicinity a first point in time based on one or more of the real-time information, the crowdsourced information and the predetermined information. The method further comprises uploading the first complexity value to the at least one of the cloud services and the vehicle network.

In view of the state of the known technology, another aspect of the present disclosure is to provide a method for displaying notification data to a driver of a vehicle. The method comprises acquiring real-time information regarding conditions near the vehicle's vicinity from an on-board satellite navigation device in communication with a global positioning system unit. The method further comprises acquiring crowdsourced information regarding conditions near the vehicle's vicinity from a telematics control unit in wireless communications to at least one of a cloud services and a vehicle network. The method further comprises acquiring predetermined complexity value thresholds from the non-transitory computer readable medium. The method further comprises determining a first complexity value related to the vehicle's vicinity a first point in time based on one or more of the real-time information, the crowdsourced information and the predetermined information. The method further comprises comparing the first complexity value to a first selected one of the predetermined complexity value thresholds. The method further comprises controlling a vehicle on-board electronic display to display notification data regarding the vehicle vicinity when determining that the first complexity value exceeds the first selected one of the predetermined complexity value thresholds.

BRIEF DESCRIPTION OF IRE DRAWINGS

Referring now to the attached drawings which form a part of this original disclosure:

FIG. 4 is a schematic view of the operations of the situational complexity determination system;

FIG. 9 is a schematic view of a fifth example of complexity data that can be displayed by the display device of the situational complexity determination system; and FIG. 10 is a sample database of prestored complexity threshold values;

FIG. 11 is a flowchart of a method that can be executed by a processor of the complexity determination system.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
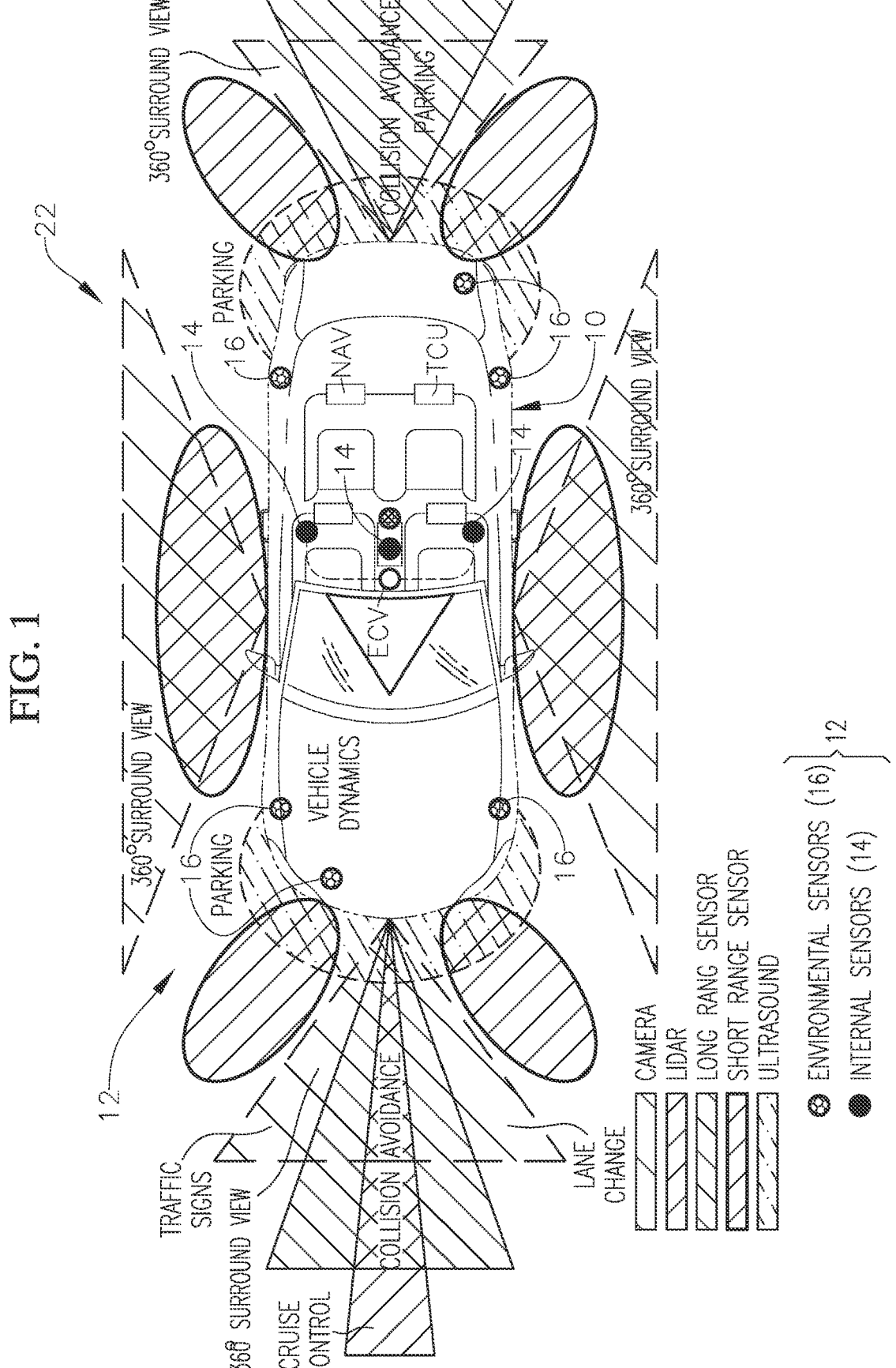
FIG. 1 is a top plan view of a vehicle equipped with a situational complexity determination system that is schematically illustrated.
Figure 2:
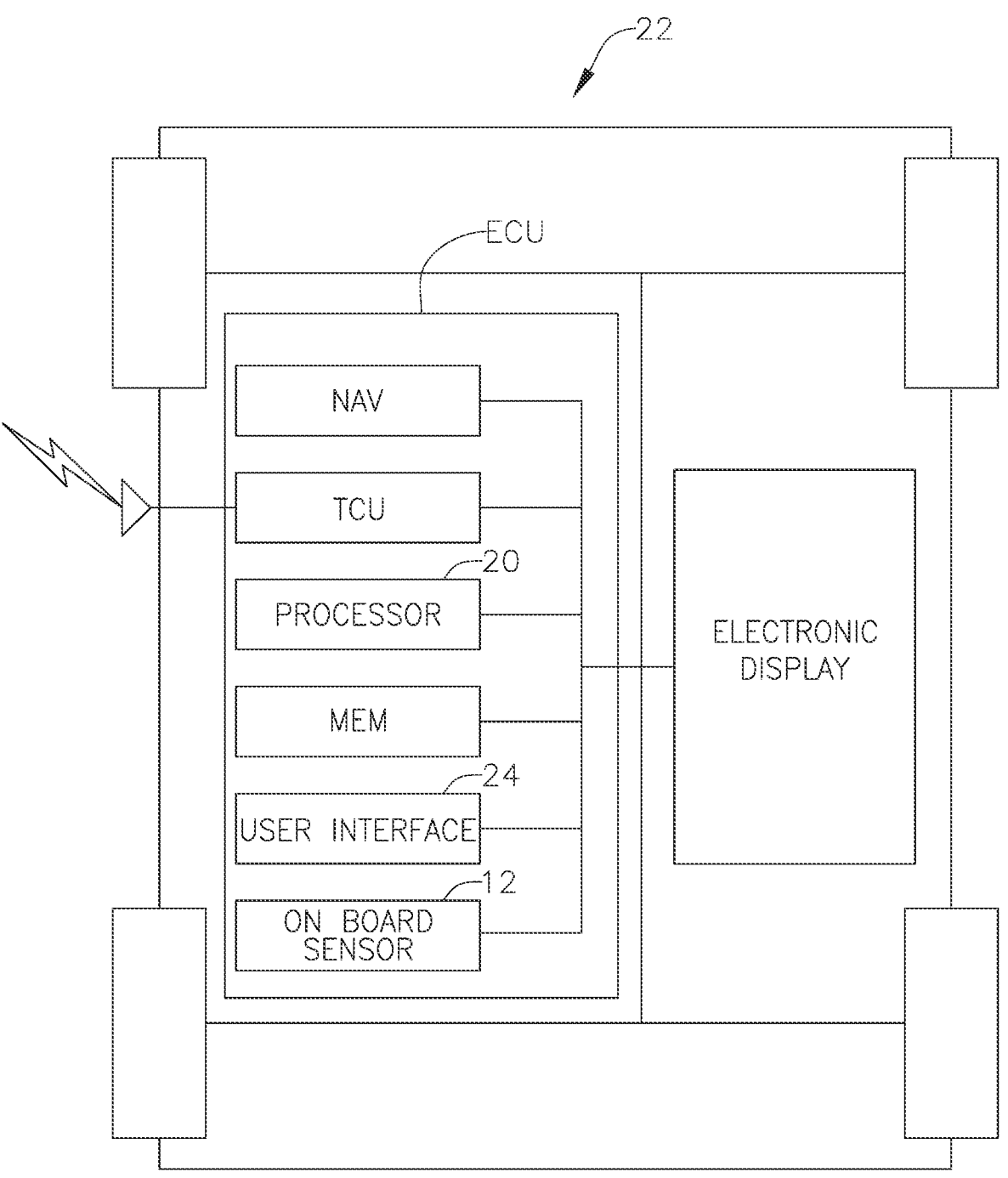
FIG. 2 is a schematic view of the components of the notification system.

Referring initially to FIG. 1, a vehicle 10 is schematically illustrated as being equipped with a plurality of control modules for navigation assistance. In the illustrated embodiment, the vehicle 10 is equipped with an on-board satellite navigation device NAV and a telematics control unit TCU, as best seen in FIGS. 1 and 2. The on-board satellite navigation device NAV and a telematics control unit TCU are considered examples of control modules for navigation assistance. The vehicle 10 is further equipped with an on-board sensor network 12 that monitors both internal and external conditions of the vehicle 10. That is, the on-board sensor network 12 includes internal sensors 14 to monitor conditions regarding the vehicle 10 interior, such as the vehicle's 10 passenger compartment. The on-board sensor network 12 further includes environmental sensors 16 that monitors conditions regarding the vehicle vicinity, as will be further discussed below.

For example, the vehicle 10 can be equipped with one or more unidirectional or omnidirectional external cameras that take moving or still images of the vehicle's 10 surroundings. In addition, the external cameras can be capable of detecting the speed, direction, yaw, acceleration and distance of the vehicle 10 relative to a remote object. The environmental sensors 16 can also include infrared detectors, ultrasonic detectors, radar detectors, photoelectric detectors, magnetic detectors, acceleration detectors, acoustic/sonic detectors, gyroscopes, lasers or any combination thereof. The environmental sensors 16 can also include object-locating sensing devices including range detectors, such as FM-CW (Frequency Modulated Continuous Wave) radars, pulse and FSK (Frequency Shift Keying) radars, sonar and Lidar (Light Detection and ranging) devices. The data from the environmental sensors 16 can be used to determine information about the vehicle's 10 vicinity, as will be further described below.

Preferably, the internal sensors 14 includes at least one internal unidirectional or omnidirectional camera positioned to detect behavior of one or more passengers in the passenger compartment. The on-board sensor network 12 further includes at least one internal microphone positioned to detect behavior of one or more passengers in the passenger compartment. The internal sensors 14 are provided to detect the behavior of the vehicle's 10 driver and/or passenger(s). For example, the internal sensors 14 can detect a state of whether the driver is distracted, unfocused or unresponsive. Cameras and microphones can detect whether the driver is engaged with a conversation with another passenger and is not paying attention to the navigation system or road conditions.

As shown in FIGS. 5 to 9, the vehicle 10 is further equipped with an electronic display device 18 configured to display notification data to the driver. The electronic display device 18 is positioned within an interior compartment (i.e., passenger compartment) of the vehicle 10. The vehicle 10 is further equipped with an electronic control unit ECU controlling the electronic display device 18 to display notification data based on information received by the on-board sensor network 12, as will be further described. In particular, the ECU includes a processor 20 for controlling the operation of a notification system of the vehicle 10, as will be further described. In the illustrated embodiment, the display device 18 is provided as part of the notification system for the vehicle 10. The processor 20 is programmed to control the electronic display device 18 to display warning information upon the based on one or more of the real-time information, the crowdsourced information and the predetermined information, as will be further described.

Figure 3:
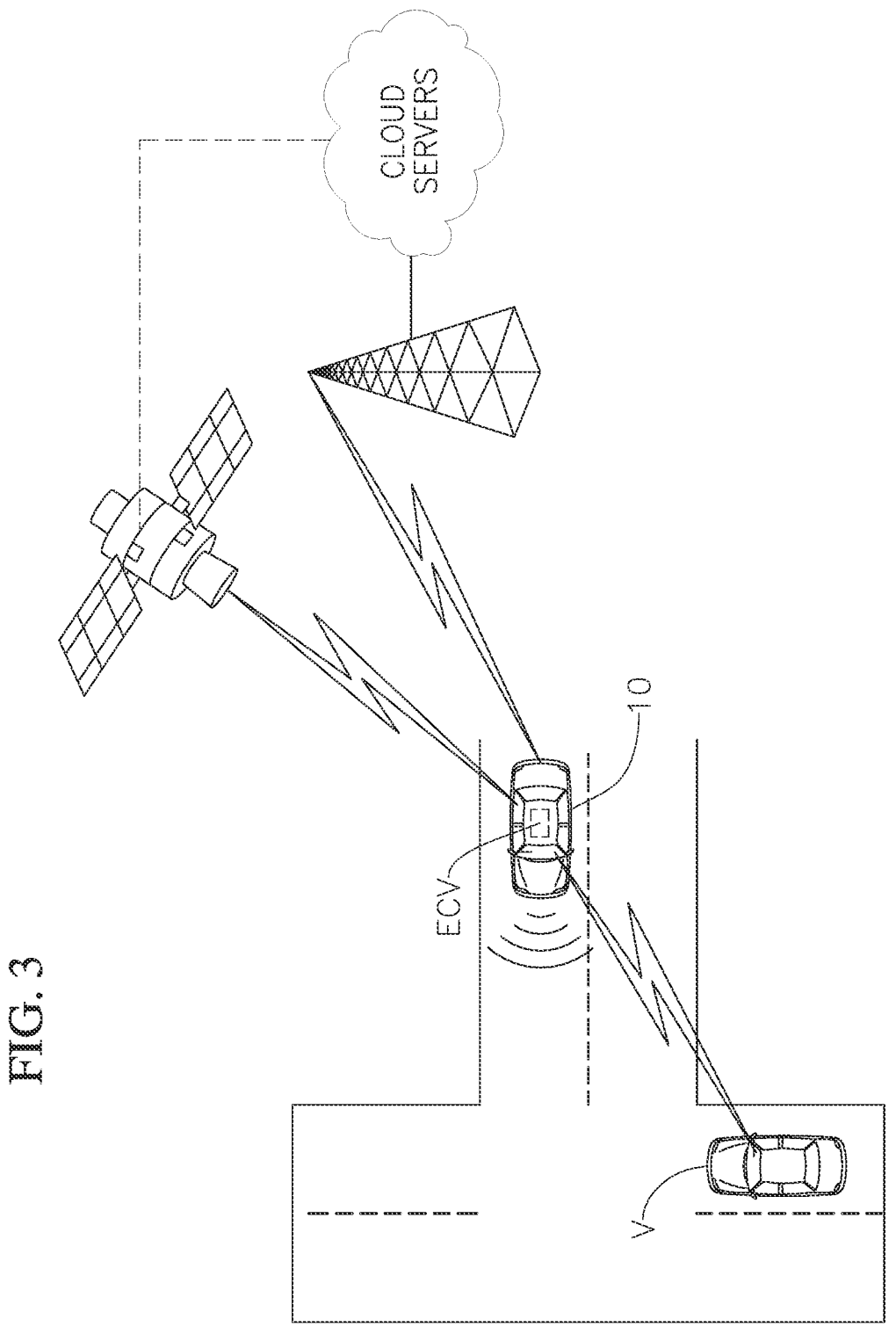
FIG. 3 is a schematic view of the vehicle as being in communication with a GPS server, a cloud server and a vehicle network.

Referring to FIGS. 2 and 3, the vehicle 10 of the illustrated embodiment is equipped with a complexity determination system 22, The complexity determination system 22 comprises the electronic control unit ECU and the on-board sensor network 12. Therefore, the complexity determination system 22 further includes the processor 20 and the non-transitory computer readable medium MEM storing predetermined information regarding conditions near the vehicle vicinity. Preferably, the complexity determination system 22 further comprises the electronic display device 18. The complexity determination system 22 further comprises the vehicle 10 having the NAV that acquires information from the GPS unit and the TCU acquiring information from the cloud server and the vehicle network. Therefore, the processor 20 is programmed to output one or more complexity values related to the vehicle's 10 vicinity during vehicle travel based on one or more of the real-time information, the crowdsourced information and the predetermined information.

In the illustrated embodiment, the complexity determination system 22 is to determine a complexity value of an anticipated situation that the vehicle 10 is likely to encounter during use. In particular, the processor 20 of the complexity determination system 22 can anticipate an upcoming situation within the vehicle vicinity and assign a complexity grade to that situation. The processor 20 is further programmed to associate the complexity grade with a navigation time or a navigation location. Therefore, the processor 20 of the complexity determination system 22 can determine changes complexity changes of the vehicle's 10 navigation over time and during travel. For example, as seen in FIG. 3, the processor 20 is programmed to generate a complexity value reflecting changing complexity grades of encountered situations over time. The processor 20 can be programmed to assign a complexity grade based on a number of factors. For example, the processor 20 can consider a number of factors such as social pressure, likelihood of collision, a number of driver decision factors, etc. The computer readable medium MEM can store the complexity value generated by the processor 20 as shown in FIG. 10. The TCU can automatically upload complexity value to the cloud server or the vehicle network at predetermined periods during vehicle travel or at the conclusion of a navigation path.

In the illustrated embodiment, "complexity value" includes graphs (like shown in FIG. 3) or numbers or numerical values such as shown in FIG. 10. Complexity value can include complexity grades, thresholds, and description of situations. For example, descriptions can reference portions of a navigation path as an area of high likelihood of collision, area with known occlusions, areas popular with pedestrians and bicyclists etc. The processor 20 can also control the display device 18 to display the complexity value as a notification. Therefore, the complexity value can be displayed as "notification data" that can include warnings, alerts, recommended maneuvers, road information, etc.

In the illustrated embodiment, the term "vehicle vicinity" refers to an area within a two hundred meter distance to a one mile distance of the vehicle 10 from all directions. "Vehicle vicinity" includes an area that is upcoming on the vehicle's 10 navigation course.

Referring again to FIGS. 1 and 2, the vehicle's 10 control modules for navigation assistance will now be further discussed. In particular, the on-board satellite navigation device NAV is in communication with a global positioning system (GPS) unit to acquire real-time information regarding conditions near the vehicle's 10 vicinity. The on-board satellite navigation device NAV can be a global navigation satellite system (GNSS) receiver or GPS receiver that is capable of receiving information from GNSS satellites then calculate the device's geographical position. Therefore, the on-board satellite navigation device NAV acquires GPS information for the vehicle 10.

As shown in FIG. 3, the on-hoard satellite navigation device NAV can also be in communication with a Wide Area Augmentation System (WAAS) enabled National Marine-Electronics Association (NMEA) unit, a radio triangulation unit, or a combination thereof. The on-board satellite navigation device NAV can obtain information that represents, for example, a current heading of the vehicle 10, a current position of the vehicle 10 in two or three dimensions, a current angular orientation of the vehicle 10 or a combination thereof. In this way, the on-board satellite navigation device NAV captures real-time information regarding conditions regarding the vehicle vicinity.

As seen in FIG. 3, the telematics control unit TCU is in wireless communications to at least one of a cloud server and a vehicle network to upload and receive crowdsourced information regarding conditions near the vehicle's 10 vicinity. The TCU receives the crowdsourced information which are preferably automatically stored into the non-transitory computer readable medium MEM, as will be further described. Data from on-board electronic control unit ECUs, the on-board sensors can also be transmitted by the TCU to the cloud server or to the vehicle network. That is, the vehicle's 10 location, method of traversal and own experience on a navigation path can also be transmitted to the cloud server or the cloud network.

The TCU is an embedded computer system that wirelessly connects the vehicle 10 to cloud services or other the vehicle network via vehicle-to-everything (V2X standards) over a cellular network. The TCU collects telemetry data regarding the vehicle such as position, speed, engine data, connectivity quality etc. by interfacing with various sub-systems and control busses in the vehicle 10. The TCU can also provide in-vehicle 10 connectivity via Wi-Fi and Bluetooth. The TCU can include an electronic processing unit, a microcontroller, a microprocessor or field programmable gate array (FPGA), which processes information and serves to interface with the GPS unit. The TCU can further include a mobile communication unit and memory for saving GPS values in case of mobile-free zones or to intelligently store information about the vehicle's sensor data. Therefore, the memory that stores the information from the TCU can either be part of the TCU or the vehicle's 10 on-board ECU. The non-transitory computer readable medium MEM further stores a plurality of predetermined complexity value thresholds, as will be further discussed.

Using the TCU, the vehicle 10 can communicate with one or more other vehicle 10 (e.g., the vehicle network), as seen in FIG. 3. For example, the TCU is capable of receiving one or more automated inter-vehicle messages, such as a basic safety message (BSM), from a remote vehicle V via a network communicated using the TCU Alternatively, the TCU can receive messages via a third party, such as a signal repeater (not shown) or another remote vehicle (not shown). The TCU can receive one or more automated inter-vehicle messages periodically, based on, for example, a defined interval, such as 100 milliseconds.

Automated inter-vehicle messages received and/or transmitted by the TCU can include vehicle identification information, geospatial state information (e.g., longitude, latitude, or elevation information, geospatial location accuracy information), kinematic state information e.g., vehicle acceleration information, yaw rate information, speed information, vehicle heading information, braking system status information, throttle information, steering wheel angle information), vehicle routing information, vehicle operating state information (e.g., vehicle size information, headlight state information, turn signal information, wiper status information, transmission information) or any other information, or combination of information, relevant to the transmitting vehicle state. For example, transmission state information may indicate whether the transmission of the transmitting vehicle is in a neutral state, a parked state, a forward state, or a reverse state.

The TCU can also communicate with the vehicle network via an access point. The access point can be a base station, a base transceiver station (BTS), a Node-B, an enhanced Node-B (eNode-B), a Home Node-B (HNode-B), a wireless router, a wired router, a hub, a relay, a switch, or any similar wired or wireless device. The vehicle 10 can communicate with the vehicle network via the NAV or the TCU. In other words, the TCU can be in communication via any wireless communication network such as high bandwidth GPRS/1× RTT channel, a wide area network (WAN) or local area network (LAN), or any cloud-based communication, for example. Therefore, using the TCU, the vehicle 10 can participate in a computing network or a cloud-based platform.

The cloud server and/or the vehicle network can provide the vehicle 10 with information that is crowdsourced from drivers, pedestrians, residents and others. For example, the cloud server and/or the vehicle network can inform the vehicle 10 of a live concert with potential for large crowds and traffic congestion along the path on or near the vehicle's 10 travel route. The cloud server and/or the vehicle network can also inform the vehicle 10 of potential pedestrians along the path on or near the vehicle's 10 travel route such as children getting off from school based on school location with respect to the vehicle's 10 navigation path and the current time. The cloud server and/or the vehicle network can also inform the vehicle 10 of conditions of general oncoming traffic, oncoming signs and lights, incoming lanes, restricted lanes, road closures, construction sites, potential vehicle encounters, accidents, and potential pedestrian encounters, etc.

The TCU can additionally transmit information regarding external vehicles, pedestrians, cyclists, obstacles, etc. that are in the vicinity of the vehicle 10. The information uploaded by the TCU regarding conditions surrounding the vehicle vicinity and uploaded to the cloud server can be considered part of the crowdsourced information of the illustrated embodiment.

The crowdsourced information obtained from the cloud server and/or the vehicle network can also include intersection geometry tags for locations pre-identified or computed to be difficult or poor visibility at junctions (based on geometric calculations, or crowdsourced data from other vehicles). This type of information can be displayed as notification data on the display device 18 as shown in Figure S.

Figure 5:
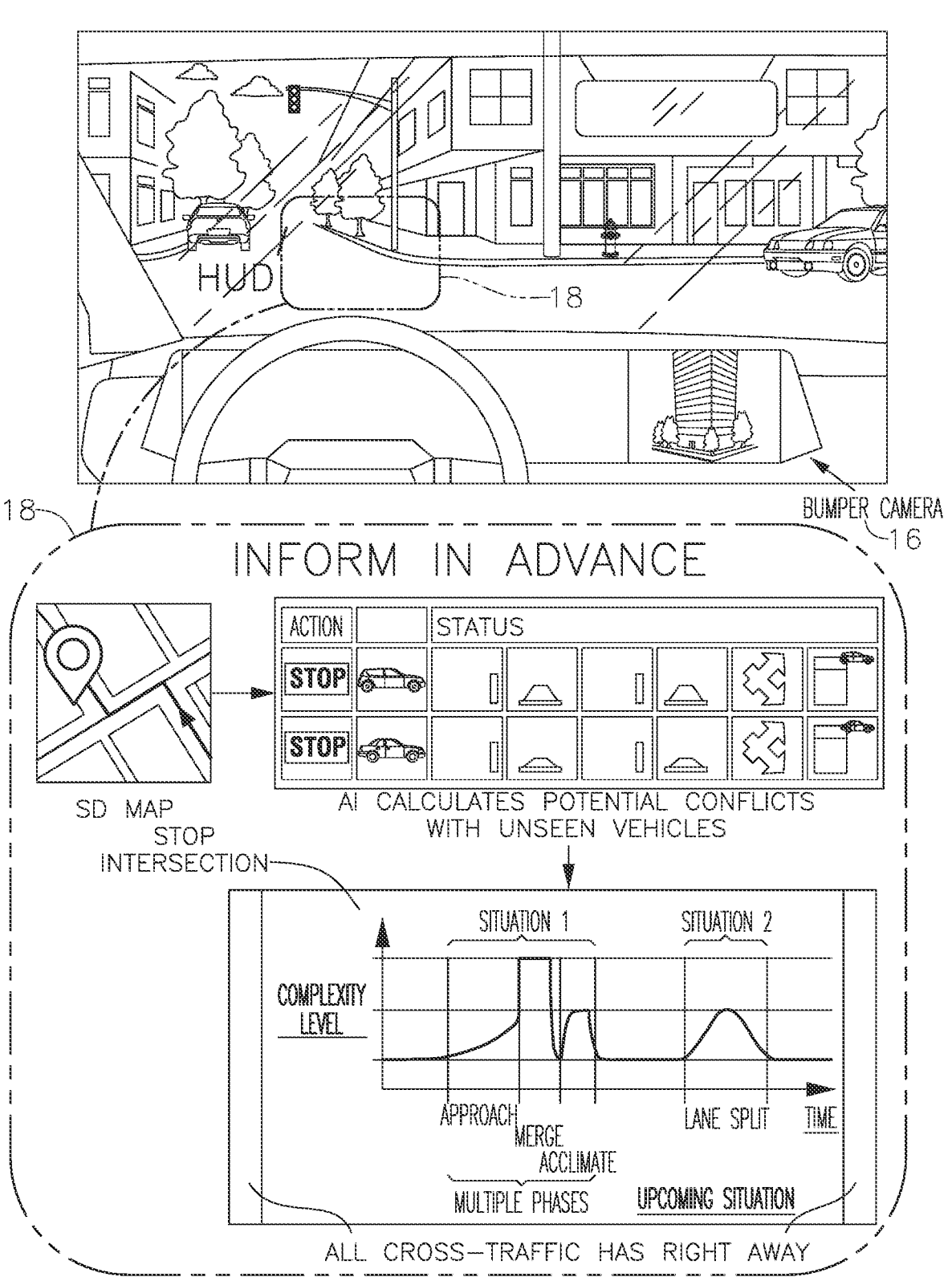
FIG. 5 is a schematic view of a first example of notification data that can be displayed by a display device of the notification system.

The TCU can also inform the vehicle 10 of information received from a transportation network and/or a pedestrian network to receive information about pedestrian navigable area, such as a pedestrian walkway or a sidewalk, may correspond with a non-navigable area of a vehicle transportation network. This type of information can be displayed as notification data on the device as shown in FIG. 5.

The vehicle network can include the one or more transportation networks that provides information regarding unnavigable areas, such as a building, one or more partially navigable areas, such as parking area, one or more navigable areas, such as roads, or a combination thereof. The vehicle 10 transportation network may include one or more interchanges between one or more navigable, or partially navigable, areas.

As stated, the vehicle 10 further comprises the on-board electronic control unit ECU, best illustrated in FIG. 2. The vehicle 10 can include more than one on-board ECUs for controlling different systems of the vehicle 10, although one is illustrated and described for simplicity. The ECU has a non-transitory computer readable medium MEM. The ECU further includes the processor 20 with microprocessor programmed to perform control functions that will be further discussed below. The non-transitory computer readable medium MEM preferably stores information such as navigation maps or road condition maps on the vehicle 10 for at least a period of time.

This information can be downloaded from the cloud server and/or the vehicle network server monthly, weekly, daily, or even multiple times in a drive, but would need to be stored locally for processing by the driver support system. Therefore, the non-transitory computer readable medium MEM preferably stores regularly updated maps with information about activities that can be encountered by the vehicle 10, such as neighborhood information. The non-transitory computer readable medium MEM preferably stores information that are downloaded from the cloud server and/or the vehicle network. This information is in conjunction with the real-time information acquired by the NAV (e.g., the GPS data). The processor 20 controls automatic download of information from the cloud server and/or the vehicle network at regular intervals.

Referring now to FIGS. 5 to 9, the electronic display is provided in the vehicle 10 interior. The display device 18 is in connection with the ECU to receive control information from the ECU. The display device 18 can include a single type display, or multiple display types (e.g., both audio and visual) configured for human-machine interaction The display device 18 include any type of display panel as desired to display notification data, navigation data and other information.

Therefore, the display device 18 can be one or more dashboard panels configured to display lights, text, images or icons. Alternatively, the display device 18 can include a heads-up display (for example shown in FIG. 5). Thus, the display device 18 can be directly mounted onto the vehicle 10 body structure, or mounted onto the windows panels. The display device 18 can alternatively be provided on a mobile device that is synced with the ECU of the vehicle 10. The display device 18 can have different shapes and sizes to accommodate the shape and contours of the vehicle 10.

Figure 4:
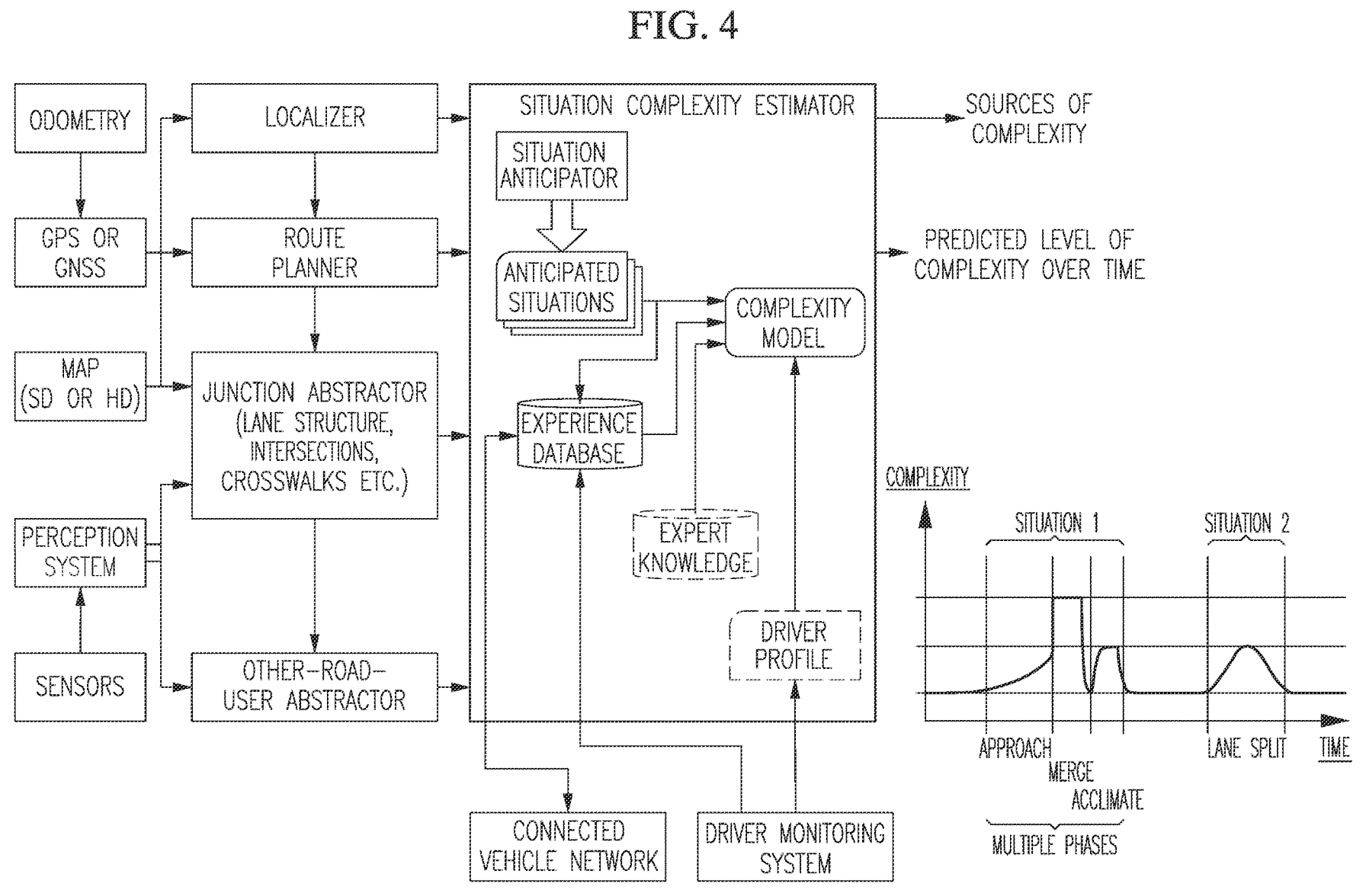

As best seen in FIGS. 2 and 4, the display device 18 further includes a set of user input interfaces 24 to communicate with the driver. The display device 18 is configured to receive user inputs from the vehicle 10 occupants. The display device 18 can include, for example, control buttons and/or control buttons displayed on a touchscreen display (e.g., hard buttons and/or soft buttons) which enable the user to enter commands and information for use by the ECU to control various aspects of the vehicle 10. For example, input interfaces 24 provided to the display device 18 can be used by the ECU to monitor the climate in the vehicle 10, interact with the navigation system, control media playback, or the like. The display device 18 can also include a microphone that enables the user to enter commands or other information vocally. The display device 18 can further include one or more speakers that provide sound alerts and sound effects including computer-generated speech.

The user can input preferences for the complexity determination system 22 into the input interfaces 24. For example, the user can activate/deactivate the complexity determination system 22 using the input interfaces 24. The user can also select between versions or modes of the complexity determination system 22 such as selecting icon preferences (e.g., size or location), display preferences (e.g., frequency of display, map based, icon based, etc.), sound OFF or sound only.

In the illustrated embodiment, the complexity determination system 22 is controlled by the processor 20. The processor 20 can include any device or combination of devices capable of manipulating or processing a signal or other information now-existing or hereafter developed, including optical processors, quantum processors, molecular processors, or a combination thereof. For example, the processor 20 can include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. As seen in FIG. 2, the processor 20 is operatively coupled with the computer readable medium MEM, the input interfaces 24, the sensor network 12, the TCU, the NAV and the display device 18.

As used herein, the terminology "processor 20" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard. Products; one or more Field Programmable Gate Arrays, any other type or combination of integrated circuits, one or more state machines, or any combination thereof.

As used herein, the terminology "memory" or "computer-readable medium" (also referred to as a processor-readable medium) indicates any computer-usable or computer-readable medium or device that can tangibly contain, store, communicate, or transport any signal or information that may be used by or in connection with any processor. For example, the computer readable medium MEM may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

Therefore, the computer-readable medium MEM further includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media can include, for example, optical or magnetic disks and other persistent memory. Volatile media may include, for example, dynamic random access memory (DRAM), which typically constitutes a main memory.

The computer readable medium MEM can also be provided in the form of one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The processor 20 can executed instructions transmitted by one or more transmission media, including coaxial cables, copper wire and fiber optics, including the wires that comprise a system bus coupled to a processor of a computer. As used herein, the terminology "instructions" may include directions or expressions for performing any method, or any portion or portions thereof, disclosed herein, and may be realized in hardware, software, or any combination thereof.

For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

Computer-executable instructions can be compiled or interpreted front computer programs created using a variety of programming languages and/or technologies, including, without limitation, and either alone or in combination, Java™, C, C++, Visual Basic, Java Script, Perl, etc. In general, the processor 20 receives instructions from the computer-readable medium and executes these instructions, thereby performing one or more processes, including One or more of the processes described herein. Such instructions and other data may be stored and transmitted using a variety of computer-readable media. For example, the processor 20 can also use information from the environmental sensors 16 to identify, the type of road (e.g., type of lanes and lane segments, urban or highway), difficulty of traversal of lane(s) and lane segment(s), density of traffic, the level of the density, etc.

Figure 7:
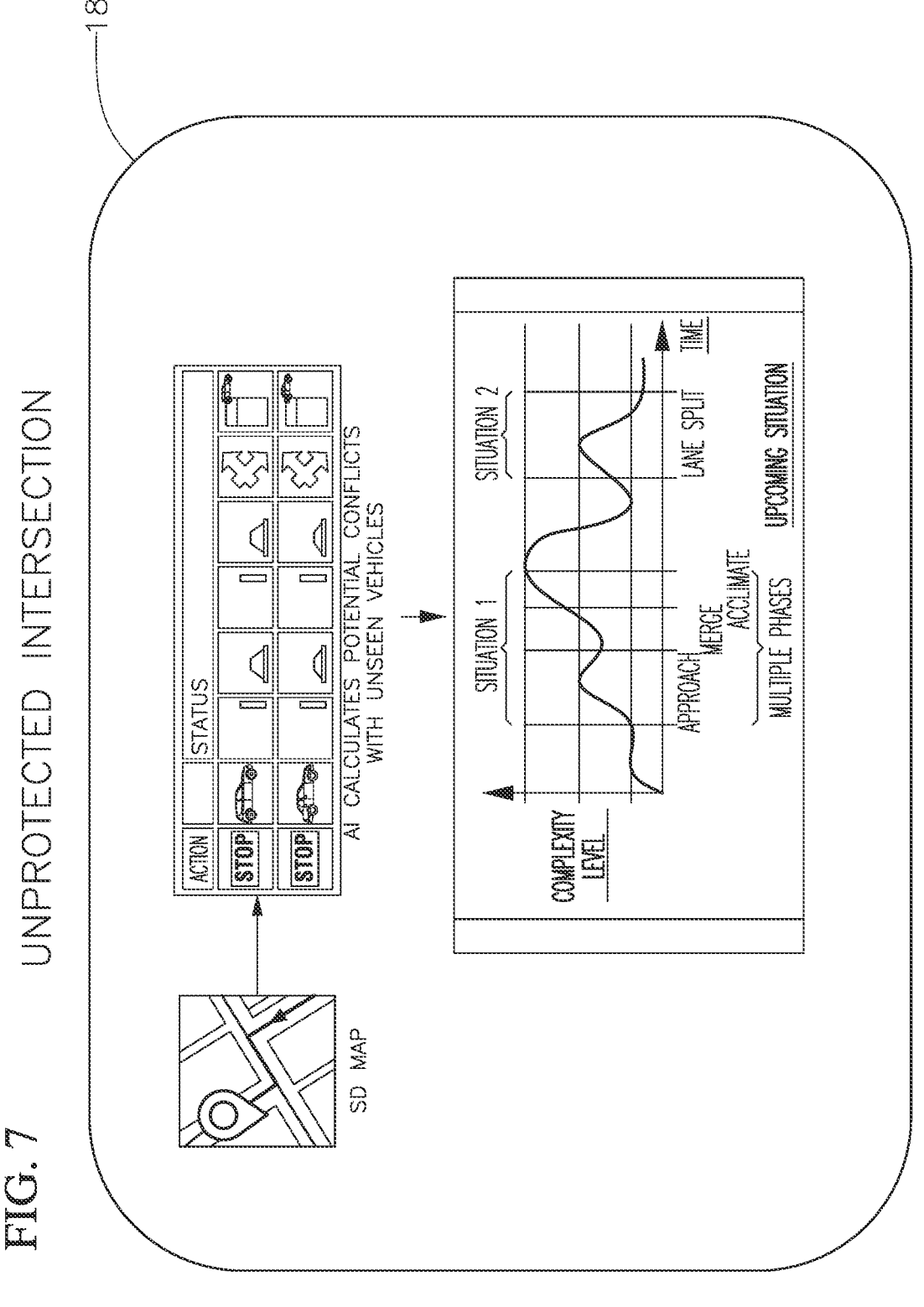
FIG. 7 is a schematic view of a third example of complexity data that can be displayed by the display device of the situational complexity determination system.
Figure 8:
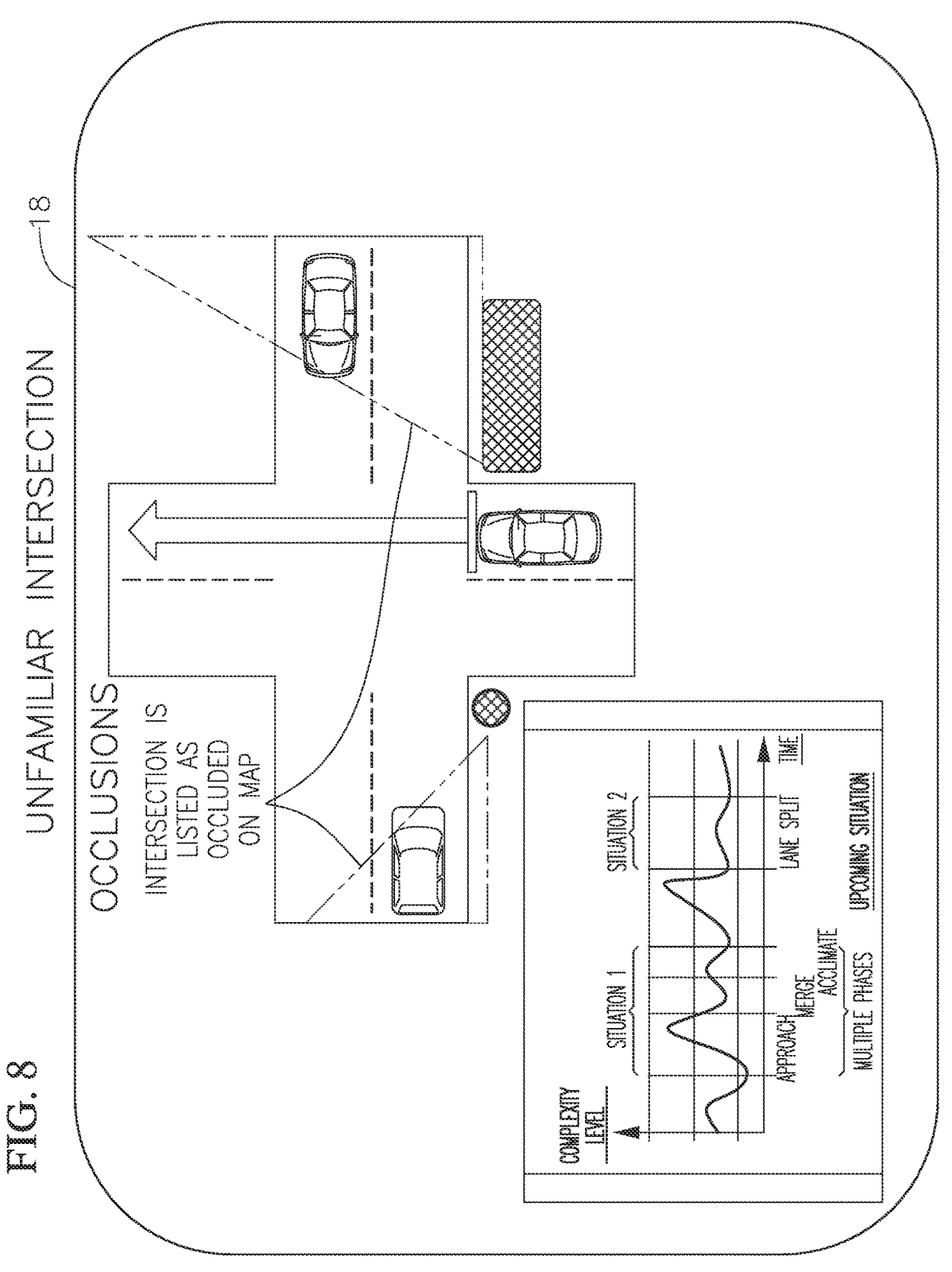
FIG. 8 is a schematic view of a fourth example of complexity data that can be displayed by the display device of the situational complexity determination system.

As stated, the processor 20 is further programmed to determine a complexity value of the upcoming situations of a vehicle navigation path. In the illustrated embodiment, the processor 20 can be programmed to give each of these upcoming situations a grade that can be a numerical value on a scale from zero (0) to ten (10), with zero being very low complexity and ten being very high complexity. In situations of high complexity (e.g., a complexity grade of five to ten) the processor 20 can control the electronic display device 18 to display appropriate notification data to reflect the complexity, for example as seen in FIGS. 7 to 9. While the illustrated embodiment portrays complexity grades as numbers on a scale of 1 to 10, it will be apparent to those skilled in the vehicle field from this disclosure that the processor 20 can assign complexity grades using a variety of values or references.

It will be apparent to those skilled in the vehicle field from this disclosure that the ECU can be connected to various control systems and control modules of the vehicle (such as the engine control module, etc.) to determine the vehicle condition, etc.

For example, when the upcoming navigation path is determined to be straight with no anticipated maneuvers required by the driver, the processor 20 can assign that portion of the path a complexity grade of 0. When the upcoming navigation path is determined to include pinch points where road space is reduced and lane change maneuvers or other vehicles engaging in lane change maneuvers are determined to be likely, the processor 20 can assign that portion of the path a complexity grade of 3. For example as seen in FIG. 5, the processor 20 can determine that the upcoming road will be narrow and that another vehicle may travel in the vicinity of the vehicle 10, the processor 20 can grade the upcoming scenario as having a complexity grade of 3 and graph that grade with respect to time.

Figure 6:
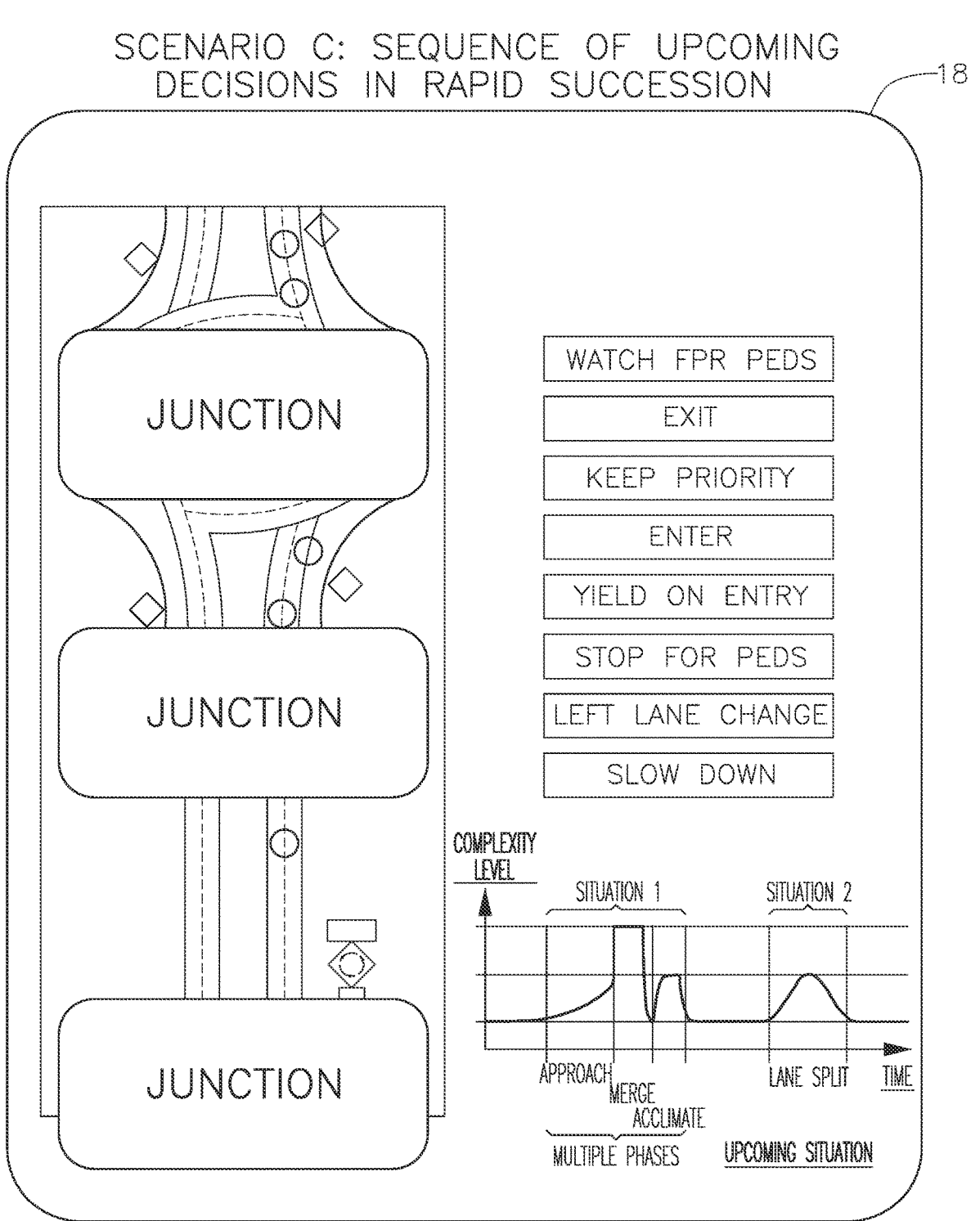
FIG. 6 is a schematic view of a second example of complexity data that can be displayed by the display device of the situational complexity determination system.

The processor 20 can also determine that the vehicle 10 is about to navigate into a path that will require a rapid sequence of upcoming decisions in succession, as shown in FIG. 6. For example, the processor 20 can assign that upcoming situation a complexity grade of 5 or 6. Therefore, the processor 20 is programmed to output a series of complexity values during vehicle travel. The complexity values can be based on at least one of a vehicle stopping event (when the vehicle 10 is anticipated to come to a stop), a vehicle deceleration event (the vehicle 10 is anticipated to decelerate), a vehicle acceleration event (the vehicle 10 needs to accelerate to make the next exit), and a lane change event (the vehicle 10 is anticipated to undergo a lane change)

The processor 20 can also assign a complexity grade based on crowdsourced information received from the cloud services and the vehicle network of FIG. 3. That is, the processor 20 is programmed to receive complexity information from the cloud services or the vehicle network via the telematics control unit TCU. For example, the TCU can acquire information that a particular route has been marked or reported by other drivers to be difficult or complicated. For example, upon the driver inputting or selecting a desired navigation route via the NAV, the TCU can obtain crowdsourced information regarding that navigation route and so that the processor 20 can generate a complexity value having a series of grades for upcoming situations on the navigation route. In other words, the processor 20 is programmed to determine a complexity value of an upcoming condition near the vehicle vicinity based on the complexity information received from at least one of the cloud services and the vehicle network. The processor 20 can use this information to then control the display device 18 to display notification data of upcoming events as necessary and/or desired.

In this example, the complexity grades having 0 to 10 values can be examples of predetermined information that is prestored in the non-transitory computer readable medium MEM. An example of a database of complexity grades is shown in FIG. 10. The sample database shown in FIG. 10 can be examples of predetermined thresholds that are stored by the computer readable medium WM. When the processor 20 assigns a complexity grade to a situation, that grade can be compared to the complexity grades that are already prestored. If the assigned grades exceed a predetermined threshold, such as 5 or above, then the processor 20 can control the display device 18 to modify the notification or alerts as necessary. Therefore, the processor 20 is programmed to control the electronic display device 18 to display warning information upon determining that the complexity value exceeds a predetermined complexity threshold.

As stated, the processor 20 can output complexity value that is graphed over time, such as during the duration of the trip (as seen in FIG. 3). The graph is considered an output of the processor 20 for the complexity determination system 22, The complexity grades that are assigned by the processor 20 to the upcoming situations are also considered outputs of the processor 20. The processor 20 can assign a complexity grade to an upcoming situation at a time from ten to sixty seconds before the vehicle 10 encounters the situation.

Preferably, the processor 20 is programmed to output a complexity value at least once per minute of vehicle travel. As stated, the processor 20 is further programmed to upload the each complexity value of the series of complexity values to the cloud services via the TCU over time so that the complexity values can be used to inform other drivers.

The complexity graphs illustrated in FIGS. 5 to 9 can be considered complexity values that are generated by the processor 20 during a navigation trip. That is, the scenarios illustrated in FIGS. 5 to 9 can be considered scenarios of a navigation trip for the vehicle 10, The complexity graph illustrated in FIG. 5 can be considered a complexity value at a first point in time of the navigation trip. The complexity graph illustrated in FIG. 6 can be considered a complexity value at a second point in time of the navigation trip. Similarly, the complexity graphs illustrated in FIGS. 7 to 9 can be considered a complexity values at third, fourth and fifth points m time of the navigation trip.

Referring now to FIG. 11, a method for displaying notification data to a driver of a vehicle 10 is illustrated. The method can be carried out by the processor 20 during a navigation trip of the vehicle 10, Therefore, FIG. 11 illustrates steps of a method that can be carried out by the processor 20. In step S1, the processor 20 acquires real-time information from the on-board satellite navigation device. Therefore, the processor 20 acquires GPS data. In step S2, the method further comprises acquiring crowdsourced information regarding conditions near the vehicle's 10 vicinity from the TCU. In step S3, the processor 20 acquires predetermined information regarding conditions near the vehicle vicinity from the non-transitory computer readable medium MEM. In particular, in step S3, the processor 20 accesses the predetermined complexity thresholds that are stored in the computer readable medium MEM, such as shown in FIG. 10.

In step S4, the processor 20 determines a first complexity value related to the vehicle's 10 vicinity a first point in time based on one or more of the real-time information, the crowdsourced information and the predetermined information. For example, the processor 20 generates the complexity values in the complexity graph illustrated in Figure that is used as an example of a first point in time. In step S5, the processor 20 compares the first complexity value to a first selected one of the predetermined complexity value thresholds.

In step S6, the processor 20 can control the electronic display to display notification data when determining that the first complexity value exceeds the first selected one of the predetermined complexity value thresholds. For example, the processor 20 matches up the scenario of the first point in time with Scenario 1 in the computer readable medium MEM of FIG. 10. The processor 20 then compares the complexity value of the first point in time with the complexity threshold value X for Scenario 1, if the complexity value is greater than the complexity threshold value X, then the processor 20 can control the display device 18 to display a warning or an alert of upcoming complexity in step S6.

Preferably, in step S7, the processor 20 determines a second complexity value related to the vehicle's 10 vicinity a second point in time. The second point in time is different from the first point in time. For example, the processor 20 generates the complexity values in the complexity graph illustrated in FIG. 6 that is used as an example of a second point in time. In step S8, the processor 20 comparing the second complexity value to a second selected one of the predetermined complexity value thresholds. For example, the processor 20 matches up the scenario of the second point in time with Scenario 2 in the computer readable medium MEM of FIG. 10. The processor then compares the complexity value of the second point in time with the complexity threshold value Y for Scenario 2. If the complexity value is greater than the complexity threshold value Y, then the processor 20 can control the display device 18 to display a warning or an alert of upcoming complexity. Therefore, in step S9, the processor 20 controls the display device 18 to display notification data regarding the vehicle vicinity when determining that the second complexity value exceeds the second selected one of the predetermined complexity value thresholds.

In the illustrated embodiment, the "first and second complexity values" are described with reference to different points in time. However, it will be apparent to those skilled in the vehicle field from this disclosure that the steps of the processor 20 for determining situational complexity is in no way limited to two points in time, but can be executed on an ongoing basis.

Figure 12:
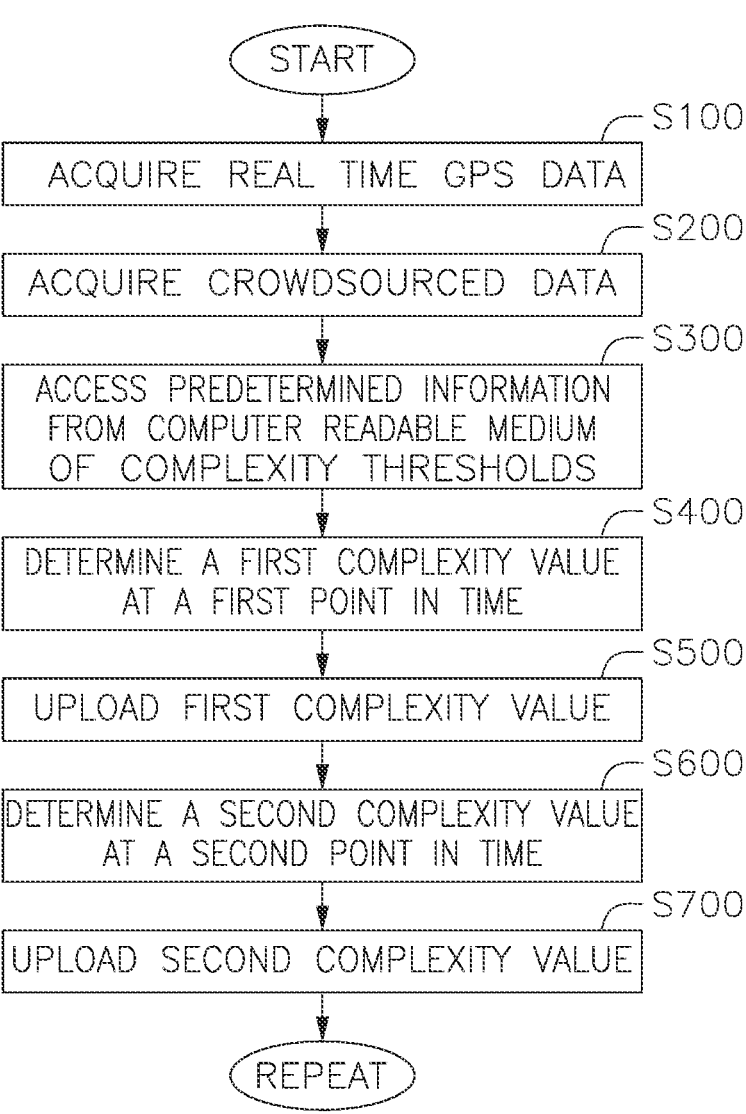
FIG. 12 is a flowchart of another method that can be executed by a processor of the complexity determination system.

Referring now to FIG. 12, a method for informing a cloud services and a vehicle network regarding complexity conditions of a travel route is illustrated. The method can be carried out by the processor 20 during a navigation trip. Therefore, FIG. 12 illustrates steps of a method that can be carried out by the processor 20.

In step S100, the processor 20 acquires real-time information from the on-board satellite navigation device. Therefore, the processor 20 acquires CIPS data. In step S200, the processor 20 acquires crowdsourced information regarding conditions near the vehicle's 10 vicinity from the TCU. In step S300, the processor 20 acquires predetermined stored in the non-transitory computer readable medium MEM.

In step S400, the processor 20 determines a first complexity value related to the vehicle's 10 vicinity a first point in time based on one or more of the real-time information, the crowdsourced information and the predetermined information. In step S500, the processor 20 instructs the TCU to upload the first complexity value to the at least one of the cloud services and the vehicle network. In step S600, the processor 20 determines a second complexity a second complexity value related to the vehicle's 10 vicinity a second point in time. The second point in time is different from the first point in time. In step S700, the processor 20 controls the TCU to upload the second complexity value to the at least one of the cloud services and the vehicle network.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment (s), the following directional terms "forward", "rearward", "above", "downward", "vertical", "horizontal", "below" and "transverse" as well as any other similar directional terms refer to those directions of a vehicle equipped with the situational complexity determination system. Accordingly, these terms, as utilized to describe the present invention should be interpreted relative to a vehicle equipped with the situational complexity determination system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially". "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle comprising:

an on-board satellite navigation device in communication with a global positioning system unit to acquire real-time information regarding conditions near the vehicle's vicinity;

a telematics control unit in wireless communications to a cloud services or a vehicle network to upload and receive crowdsourced information regarding conditions near the vehicle's vicinity;

a non-transitory computer readable medium storing predetermined information regarding conditions near the vehicle vicinity;

a processor programmed to output one or more complexity graphs, each of the complexity graphs having a series of complexity values that are graphed with respect to time during vehicle travel, the series of complexity values being related to the vehicle's vicinity during vehicle travel based on one or more of the real-time information, the crowdsourced information and the predetermined information, the series of complexity values of the complexity graphs being indicative of a complexity of an upcoming situation along a vehicle navigation path; and an electronic display device positioned within an interior compartment of the vehicle, the processor being programmed to control the electronic display device to display notification data based upon the one or more of the real-time information, the crowdsourced information and the predetermined information, the notification data including the one or more complexity graphs.

2. The vehicle according to claim 1, wherein the series of complexity values are based on at least one of a vehicle stopping event, a vehicle deceleration event and a lane change event.

3. The vehicle according to claim 2, wherein the processor is programmed to update the one or more complexity graphs at least once per minute of vehicle travel to include at least one additional complexity value.

4. The vehicle according to claim 3, wherein the processor is further programmed to upload the one or more complexity graphs to the cloud services via the telematic control unit during vehicle travel.

5. The vehicle according to claim 4, wherein the processor is further programmed to receive complexity information from the cloud services or the vehicle network via the telematics control unit.

*     *     *     *     *